US010483641B2

(12) United States Patent
Lehtola

(10) Patent No.: US 10,483,641 B2
(45) Date of Patent: Nov. 19, 2019

(54) ANTENNA SWITCH MODULES AND METHODS OF MAKING THE SAME

(71) Applicant: Skyworks Solutions, Inc., Woburn, CA (US)

(72) Inventor: Philip John Lehtola, Cadar Rapids, IA (US)

(73) Assignee: Skyworks Solutions, Inc., Woburn, MA (US)

( * ) Notice: Subject to any disclaimer, the term of this patent is extended or adjusted under 35 U.S.C. 154(b) by 311 days.

(21) Appl. No.: 14/869,789

(22) Filed: Sep. 29, 2015

(65) Prior Publication Data

US 2016/0093948 A1 Mar. 31, 2016

Related U.S. Application Data

(60) Provisional application No. 62/057,951, filed on Sep. 30, 2014.

(51) Int. Cl.
*H04B 1/44* (2006.01)
*H01Q 5/321* (2015.01)

(52) U.S. Cl.
CPC .................................. *H01Q 5/321* (2015.01)

(58) Field of Classification Search
CPC .......... H01Q 5/314; H01Q 5/321; H01Q 1/52; H01Q 1/50; H04B 1/44; H04B 1/50
USPC ............... 343/852, 861, 876; 455/78, 82, 83
See application file for complete search history.

(56) References Cited

U.S. PATENT DOCUMENTS 5,054,114 A * 10/1991 Erickson .................. H04B 1/48 333/101
7,194,241 B2 3/2007 Schmitz et al.
7,283,793 B1 * 10/2007 McKay ................ H04B 1/0458 333/103
7,508,285 B2 * 3/2009 Kokubo ............... H03H 7/0115 333/175
7,512,388 B2 3/2009 Snider
7,729,674 B2 6/2010 Shie et al.
8,000,737 B2 * 8/2011 Caimi .................... H01Q 1/243 455/103
8,786,079 B2 7/2014 Lee et al.
8,987,061 B2 3/2015 Lee et al.
9,654,169 B2 5/2017 Wloczysiak
9,712,196 B2 7/2017 Ripley et al.
9,859,945 B2 1/2018 Obkircher et al.
(Continued)

*Primary Examiner* — Dameon E Levi
*Assistant Examiner* — Hasan Z Islam
(74) *Attorney, Agent, or Firm* — Knobbe, Martens, Olson & Bear, LLP

(57) ABSTRACT

Antenna switch modules and methods of making the same are provided. In one implementation, an antenna switch module includes a first transmit and first receive port that are respectively connected to at least one antenna series switches. The first receive and transmit port receive and transmit signals on a first frequency. In one implementation, a second transmit and second receive port are connected to the at least one antenna and transmit and receive signals on a second frequency. In this implementation, the second receive port is connected to the at least one antenna via a series switch but the second transmit port is connected to the at least one antenna via a inductive resonance circuit that provides impedance to isolate the second transmit port when the first transmit port or receive port is transmitting or receiving via the at least one antenna.

25 Claims, 6 Drawing Sheets

(56) References Cited

U.S. PATENT DOCUMENTS

| | | | | |
|---|---|---|---|---|
| 9,966,982 | B2 | 5/2018 | Ripley et al. | |
| 2010/0003941 | A1* | 1/2010 | Kojima | H04B 1/48 455/269 |
| 2015/0054697 | A1* | 2/2015 | Chen | H01Q 1/50 343/745 |
| 2015/0147980 | A1* | 5/2015 | Larsen | H01Q 5/314 455/77 |
| 2015/0188237 | A1* | 7/2015 | Apostolos | H01Q 21/068 343/824 |
| 2015/0249479 | A1* | 9/2015 | Nobbe | H04B 17/12 455/77 |
| 2015/0349770 | A1* | 12/2015 | Bakalski | H04B 1/006 455/78 |

* cited by examiner

ANTENNA SWITCH MODULES AND METHODS OF MAKING THE SAME

BACKGROUND OF THE INVENTION

1. Field of the Invention

Embodiments of the invention relate to electronic systems, and in particular, to radio frequency (RF) electronics.

2. Description of the Related Technology

An RF system can include an antenna for receiving and/or transmitting RF signals. However, there can be several components in an RF system that may need to access to the antenna. For example, an RF system can include different transmit or receive paths associated with different frequency bands, different communication standards and/or different power modes, and each path may need access to the antenna at certain instances of time.

An antenna switch module can be used to electrically connect an antenna to a particular transmit or receive path of the RF system, thereby allowing multiple components to access the antenna. The performance of the antenna switch module can be important, since the antenna switch module can introduce noise and/or insertion loss. Furthermore, the antenna switch module has active components that either consume power or create dissipative loss. For mobile devices, this loss reduces the available battery power and device operational life.

There is a need for an antenna switch module that permits multiple transmit and receive paths of the RF system to consumes less power as the consumption of less power prolongs battery life and, in particular, has antenna switch module components that are selected to provide less dissipative loss.

SUMMARY OF THE INVENTION

The aforementioned needs are addressed in one exemplary embodiment that comprises an antenna switch module that interconnects a transceiver and an antenna, the module comprising: a first transmit port and a first receive port that operate at a first frequency; a second transmit port and a second receive port that operate at a second frequency; a plurality of switches that selectively connect the first transmit port, the first receive port, and one of the second transmit port or the second receive port to the antenna; and a resonance impedance circuit that connects at least one of the second transmit port or the second receive port to the antenna, the resonance impedance circuit having components selected to provide a high impedance path when signals are being transmitted at the first frequency.

In another implementation of this embodiment, the resonance impedance circuit connects the second transmit port to the antenna and one of the plurality of switches connects the second receive port to the antenna.

In another implementation of this embodiment, each of the ports are further connected to ground through a controllable shunt switching device such that when a port is not selected to receive or transmit, the port is configured to be connected to ground to provide isolation for another of the ports that is selected to transmit or receive.

In another implementation of this embodiment, the first frequency range includes a lower frequency range than the second frequency range.

In another implementation of this embodiment the first frequency range includes frequencies in the range of the 1800/1900 MHz band and the second frequency range includes frequencies in the range of the 850/900 MHz band.

In another implementation of this embodiment, the resonance circuit includes a ¼ wave impedance transformer.

In another implementation of this embodiment, the resonance circuit includes a parallel LC circuit component in series with an inductor.

In another implementation of this embodiment, the resonance circuit includes a parallel LC circuit with a shunt pre-match capacitor that is positioned on the second frequency receive port to resonate out the inductive load seen on the second frequency transmit path when the second frequency receive path is enabled.

In another implementation of this embodiment, the antenna switch module further comprising a third transmit and receive port that operates on a third frequency.

In another implementation of this embodiment, either the third transmit or receive port has a first resonance circuit that resonates at the first frequency so as to isolate the third transmit or receive port at that frequency.

In another implementation of this embodiment, the antenna module further comprising a second resonance circuit on the third transmit or receive port that resonates at the second frequency so as to isolate the third transmit or receive port at that frequency.

The aforementioned needs are also met by another exemplary embodiment which comprises an antenna switch module for switching signals between at least one antenna and a transceiver, the module comprising: a first transmit port and a first receive port that operate at a first frequency range and selectively connect to the antenna and the transceiver; a second transmit port and a second receive port that operate at a second frequency range and selectively connect to the antenna and the transceiver; a plurality of controllable switching devices respectively positioned in series between the antenna and the first transmit, first receive, and second receive ports so that the first transmit, first receive, and second receive ports are selectively connectable to or isolatable from the antenna; and a resonance circuit connected in series between the second transmit port and the antenna and selected to resonate at the first frequency range to create an impedance sufficient to isolate the second transmit port from the antenna when the antenna is receiving or transmitting signals at the first frequency range.

In another implementation of this embodiment, each of the ports are further connected to ground through a controllable shunt switching device such that when a port is not selected to receive or transmit, the port is configured to be connected to ground to provide isolation for another of the ports that is selected to transmit or receive.

In another implementation of this embodiment, the first frequency range includes a lower frequency range than the second frequency range.

In another implementation of this embodiment, the first frequency range includes frequencies in the range of the 1800/1900 MHz band and the second frequency range includes frequencies in the range of the 850/900 MHz band.

In another implementation of this embodiment, the resonance circuit includes a ¼ wave impedance transformer.

In another implementation of this embodiment, the resonance circuit includes a parallel LC circuit component in series with an inductor.

In another implementation of this embodiment, the resonance circuit includes a parallel LC circuit with a pre-match shunt capacitor that is positioned on the second frequency receive port to resonate out the inductive load seen on the second frequency transmit path when the second frequency receive path is enabled.

The aforementioned needs are also met by one exemplary embodiment which comprises a wireless device comprising: at least one antenna; a transceiver; and an antenna switch module including a first transmit port and a first receive port that operate at a first frequency range and selectively connect to the antenna and the transceiver, the module further including a second transmit port and a second receive port that operate at a second frequency range and selectively connect to the antenna and the transceiver, the module further including a plurality of controllable switching devices respectively positioned in series between the antenna and the first transmit, first receive, and second receive ports so that the first transmit, first receive and second receive ports are selectively connectable to or isolatable from the antenna, and the module further including a resonance circuit that is connected in series between the second transmit port and the antenna and is selected to resonate at the first frequency range to create an impedance sufficient to isolate the second transmit port from the antenna when the antenna is operating at the first frequency range.

In another implementation of this embodiment each of the ports are further connected to ground through a controllable shunt switching device such that when a port is not selected to receive or transmit, the port is configured to be connected to ground to provide isolation for another of the ports that is selected to transmit or receive.

In another implementation of this embodiment, the first frequency range includes a lower frequency range than the second frequency range.

In another implementation of this embodiment, the first frequency range includes frequencies in the range of the 1800/1900 MHz band and the second frequency range includes frequencies in the range of the 850/900 MHz band.

In another implementation of this embodiment, the resonance circuit includes a ¼ wave impedance transformer.

In another implementation of this embodiment, the resonance circuit includes a parallel LC circuit component in series with an inductor.

In another implementation of this embodiment, the resonance circuit includes a parallel LC circuit with a shunt pre-match capacitor that is positioned on the second frequency receive port to resonate out the inductive load seen on the second frequency transmit path when the second frequency receive path is enabled.

In another implementation of this embodiment, the wireless device includes a device that provides cellular telephony communications via the device and the at least one antenna.

In another implementation of this embodiment, the module further comprising a third transmit and receive port that operates on a third frequency.

In another implementation of this embodiment, either the third transmit or receive port has a first resonance circuit that resonates at the first frequency so as to isolate the third transmit or receive port at that frequency.

In another implementation of this embodiment, the module further comprising a second resonance circuit on the third transmit or receive port that resonates at the second frequency so as to isolate the third transmit or receive port at that frequency.

DETAILED DESCRIPTION OF EMBODIMENTS

The headings provided herein, if any, are for convenience only and do not necessarily affect the scope or meaning of the claimed invention.

Antenna switch modules and methods of making the same are disclosed herein. In certain implementations, an antenna switch module is provided for selecting a particular RF transmit or receive path. The Antenna switch module has two separate transmission/receiving paths that operated on a first and a second frequency wherein the second frequency is higher than the first frequency. In one non-limiting implementation, the first and second frequencies may comprise a GSM 850/900 band and a GSM 1800/1900 band. Alternatively, the bands may comprise other well-known bands such as EDGE, WCDMA or bands to be developed in the future. In this implementation, at least one of the transmit and receive paths uses switching networks to isolate the band when not in use. In this implementation, at least one of the paths uses a resonance component, instead of a switching network, to isolate the path when the path is not in use. The use of the resonance component, which can comprise an LC network in one non-limiting example, provides isolation for the path with less dissipative loss than a corresponding switching network or device and can also provide harmonic filtering for the first frequency. As a consequence, the power dissipation when the path having the resonance component is reduced when this path is in use. When the path having the resonance component comprises a path that has a high maximum output power, the dissipative loss can result in significantly improved efficiency of the antenna switch module leading to less power consumption and longer battery life. These features will be described in the exemplary, non-limiting embodiments described below.

Figure 1:
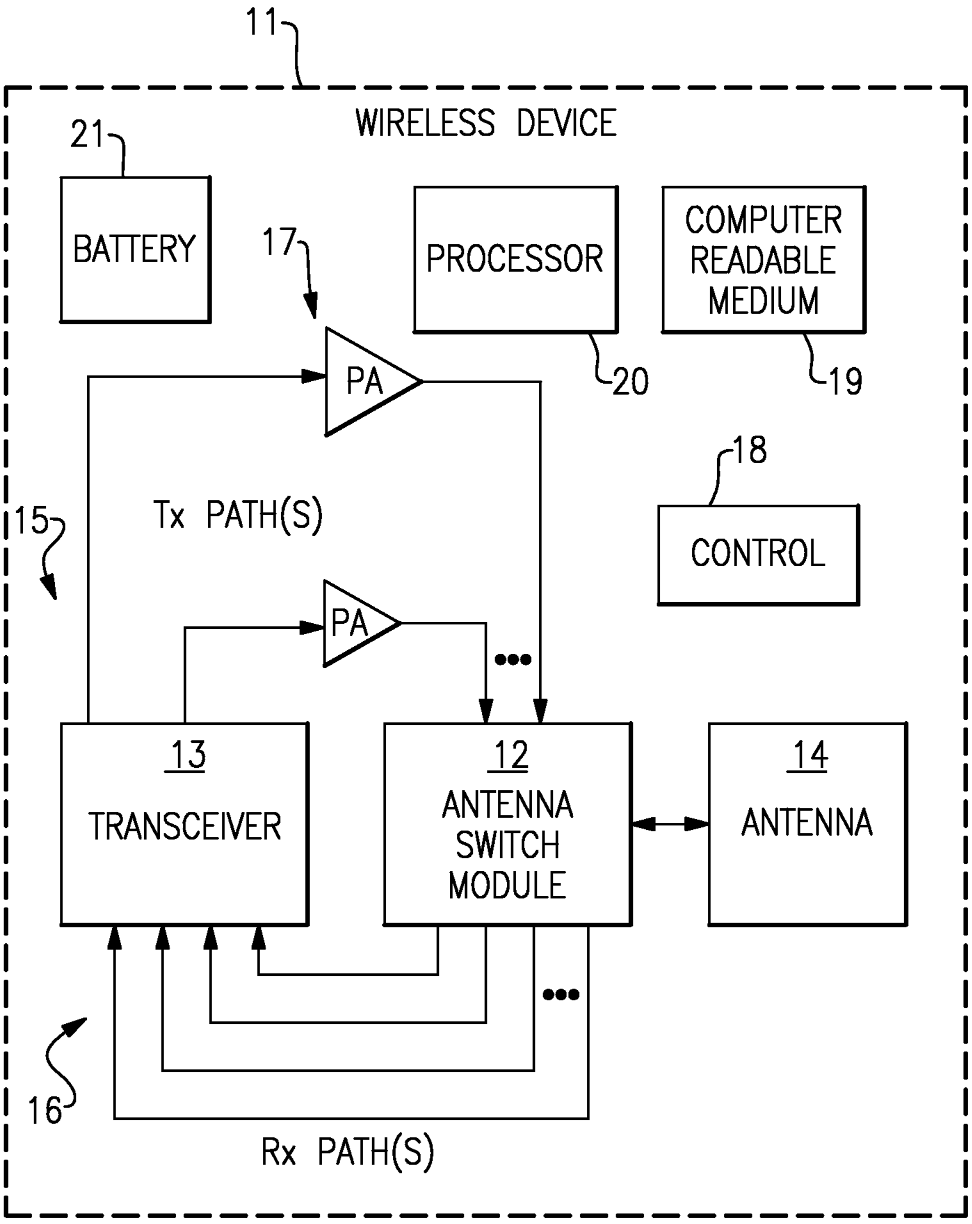
FIG. 1 is a schematic block diagram of one example of a wireless device that can include one or more antenna switch modules.

Overview of Examples of Wireless Devices that can Include Antenna Switch Modules FIG. 1 is a schematic block diagram of one example of a wireless or mobile device 11 that can include one or more antenna switch modules. The wireless device 11 can include antenna switch modules implementing one or more features of the present disclosure.

The example wireless device 11 depicted in FIG. 1 can represent a multi-band and/or multi-mode device such as a multi-band/multi-mode mobile phone. By way of examples, Global System for Mobile (GSM) communication standard is a mode of digital cellular communication that is utilized in many parts of the world. GSM mode mobile phones can operate at one or more of four frequency bands: 850 MHz (approximately 824-849 MHz for Tx, 869-894 MHz for Rx), 900 MHz (approximately 880-915 MHz for Tx, 925-960 MHz for Rx), 1800 MHz (approximately 1710-1785 MHz for Tx, 1805-1880 MHz for Rx), and 1900 MHz (approximately 1850-1910 MHz for Tx, 1930-1990 MHz for Rx). Variations and/or regional/national implementations of the GSM bands are also utilized in different parts of the world.

Code division multiple access (CDMA) is another standard that can be implemented in mobile phone devices. In certain implementations, CDMA devices can operate in one or more of 800 MHz, 900 MHz, 1800 MHz and 1900 MHz bands, while certain W-CDMA and Long Term Evolution (LTE) devices can operate over, for example, about 22 radio frequency spectrum bands.

Antenna switch modules of the present disclosure can be used within a mobile device implementing the foregoing example modes and/or bands, and in other communication standards. For example, 3G, 4G, LTE, and Advanced LTE are non-limiting examples of such standards.

In certain embodiments, the wireless device 11 can include an antenna switch module 12, a transceiver 13, an antenna 14, power amplifiers 17, a control component 18, a computer readable medium 19, a processor 20, and a battery 21.

The transceiver 13 can generate RF signals for transmission via the antenna 14. Furthermore, the transceiver 13 can receive incoming RF signals from the antenna 14. It will be understood that various functionalities associated with transmitting and receiving of RF signals can be achieved by one or more components that are collectively represented in FIG. 1 as the transceiver 13. For example, a single component can be configured to provide both transmitting and receiving functionalities. In another example, transmitting and receiving functionalities can be provided by separate components.

In FIG. 1, one or more output signals from the transceiver 13 are depicted as being provided to the antenna 14 via one or more transmission paths 15. In the example shown, different transmission paths 15 can represent output paths associated with different bands and/or different power outputs. For instance, the two different paths shown can represent paths associated with different power outputs (e.g., low power output and high power output), and/or paths associated with different bands. The transmit paths 15 can include one or more power amplifiers 17 to aid in boosting a RF signal having a relatively low power to a higher power suitable for transmission. Although FIG. 1 illustrates a configuration using two transmission paths 15, the wireless device 11 can be adapted to include more or fewer transmission paths 15.

In FIG. 1, one or more detected signals from the antenna 14 are depicted as being provided to the transceiver 13 via one or more receiving paths 16. In the example shown, different receiving paths 16 can represent paths associated with different bands. For example, the four example paths 16 shown can represent quad-band capability that some wireless devices are provided with. Although FIG. 1 illustrates a configuration using four receiving paths 16, the wireless device 11 can be adapted to include more or fewer receiving paths 16.

To facilitate switching between receive and/or transmit paths, the antenna switch module 12 can be included and can be used to electrically connect the antenna 14 to a selected transmit or receive path. Thus, the antenna switch module 12 can provide a number of switching functionalities associated with an operation of the wireless device 11. The antenna switch module 12 can include a multi-throw switch configured to provide functionalities associated with, for example, switching between different bands, switching between different power modes, switching between transmission and receiving modes, or some combination thereof. The antenna switch module 12 can also be configured to provide additional functionality, including filtering and/or duplexing of signals.

FIG. 1 illustrates that in certain embodiments, the control component 18 can be provided for controlling various control functionalities associated with operations of the antenna switch module 12 and/or other operating component(s). For example, the control component 18 can aid in providing control signals to the antenna switch module 12 so as to select a particular transmit or receive path. Non-limiting examples of the control component 18 are described herein in greater detail.

In certain embodiments, the processor 20 can be configured to facilitate implementation of various processes on the wireless device 11. The processor 20 can be a general purpose computer, special purpose computer, or other programmable data processing apparatus. In certain implementations, the wireless device 11 can include a computer-readable memory 19, which can include computer program instructions that may be provided to and executed by the processor 20.

The battery 21 can be any suitable battery for use in the wireless device 11, including, for example, a lithium-ion battery.

Figure 2:
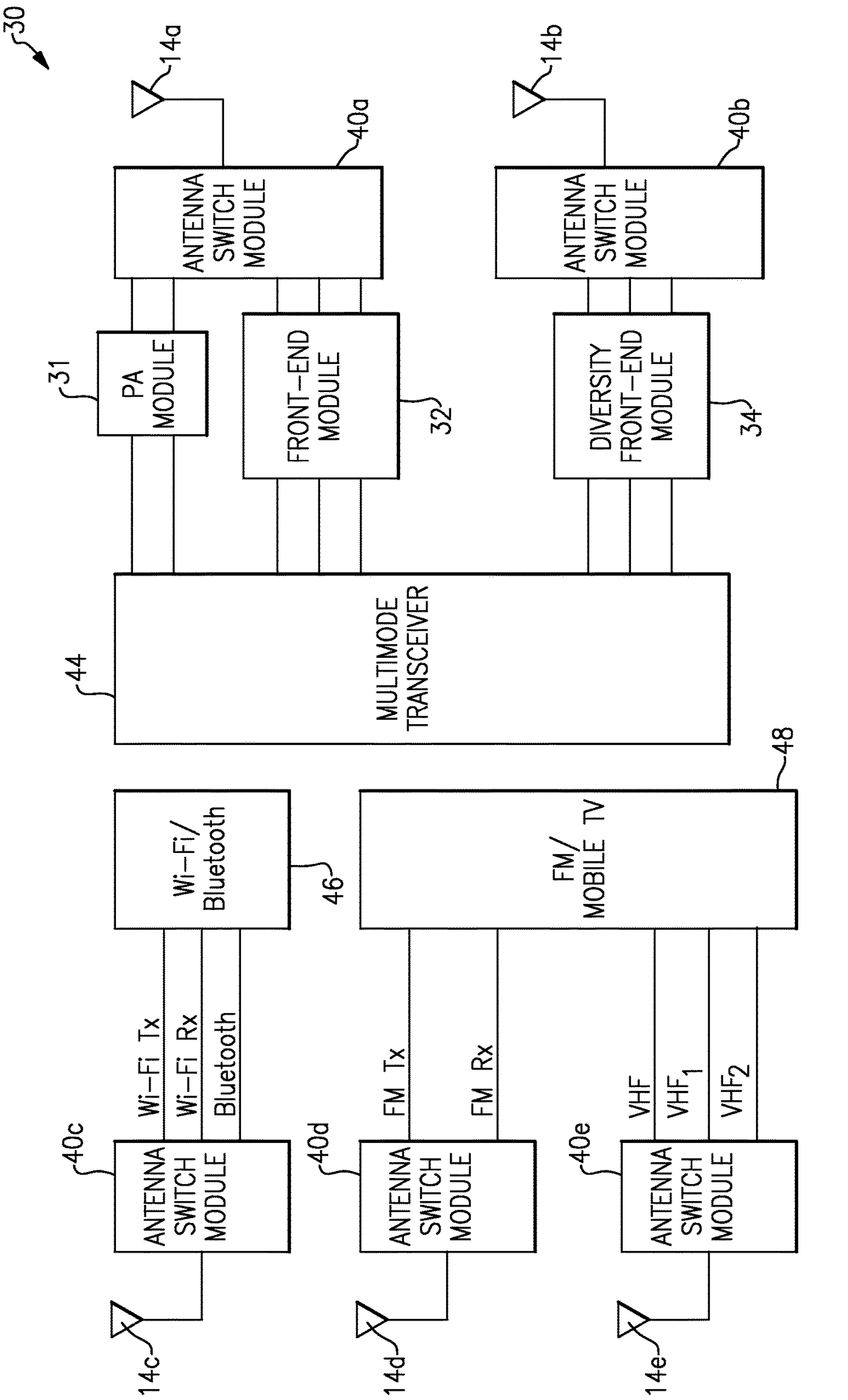
FIG. 2 is a schematic block diagram of another example of a wireless device that can include one or more antenna switch modules.

FIG. 2 is a schematic block diagram of another example of a wireless device 30 that can include one or more antenna switch modules. The illustrated wireless device 30 includes first to fifth antennas 14*a*-14*e*, a power amplifier module 31, a front-end module 32, a diversity front-end module 34, first to fifth antenna switch modules 40*a*-40*e*, a multimode transceiver 44, a Wi-Fi/Bluetooth module 46, and a FM/Mobile TV module 48.

The multimode transceiver 44 is electrically coupled to the power amplifier module 31, to the front-end module 32, and to the diversity front-end module 34. The multimode transceiver 44 can be used to generate and process RF signals using a variety of communication standards, including, for example, Global System for Mobile Communications (GSM), Code Division Multiple Access (CDMA), wideband CDMA (W-CDMA), Enhanced Data Rates for GSM Evolution (EDGE), and/or other proprietary and non-proprietary communications standards.

The power amplifier module 31 can include one or more power amplifiers, which be used to boost the power of RF signals having a relatively low power. Thereafter, the boosted RF signals can be used to drive the first antenna 14*a*. The power amplifier module 31 can include power amplifiers associated with different power outputs (e.g., low power output and high power output) and/or amplifications associated with different bands.

The front-end module 32 can include circuitry that can aid the multimode transceiver 44 in transmitting and receiving RF signals. For example, the front-end module 32 can include one or more low noise amplifiers (LNAs) for amplifying signals received using the first antenna 14*a*. The front-end module 32 can additionally and/or alternatively include filter circuitry, input and output matching circuitry and/or power detection circuitry. In certain implementations, the front-end module 32 can also include one or more power amplifiers.

The first antenna switch module 40*a* is electrically coupled to the first antenna 14*a*, to the power amplifier module 31, and to the front-end module 32. The first antenna switch module 40*a* can be used to electrically connect the first antenna 14*a* to a desired transmit or receive path. In certain embodiments described herein, the antenna switch module 40*a* can have a relatively small area, thereby improving the form factor of a mobile device used to communicate over a cellular or other network. The antenna switch module 40*a* can also have a low insertion loss and high band-to-band isolation, which can improve the quality of signals transmitted or received. For example, the antenna switch module can improve the quality of voice or data transmissions made using the first antenna 14*a* and/or improve reception quality for a given amount of power consumption.

In certain implementations, the diversity front-end module 34, the second antenna switch module 40*b*, and the second or diversity antenna 14*b* can also be included. Using a diversity front-end module 34 and the second antenna 14*b* can help improve the quality and/or reliability of a wireless link by reducing line-of-sight losses and/or mitigating the impacts of phase shifts, time delays and/or distortions associated with signal interference of the first antenna 14*a*. In some implementations, a plurality of diversity front-end modules, diversity antennas, and antenna switch modules can be provided to further improve diversity.

As illustrated in FIG. 2, the second antenna switch module 40*b* has been used to select amongst a multitude of RF signal paths associated with the diversity antenna 14*b*. In certain embodiments described herein, the second antenna switch module 14*b* can have a small area and a relatively low insertion loss and noise. Accordingly, the second antenna switch module 14*b* can help improve signal quality in the diversity signal path for a given power level, thereby reducing the probability of a call drop-out or a lost connection. Furthermore, by providing an antenna switch module with a smaller area, the form factor of the wireless device 30 can be reduced.

The wireless device 30 includes the Wi-Fi/Bluetooth module 46, which can be used to generate and process received Wi-Fi and/or Bluetooth signals. For example, the Wi-Fi/Bluetooth module 46 can be used to connect to a Bluetooth device, such as a wireless headset, and/or to communicate over the Internet using a wireless access point or hotspot. To aid in selecting a desired Wi-Fi or Bluetooth signal path, the third antenna switch module 14*c* has been included. In certain embodiments described herein, the antenna switch module 40*c* can have a relatively small area, thereby improving the form factor of a mobile device used to communicate over the Internet and/or with a Bluetooth accessory. The antenna switch module 40*c* can also have a low insertion loss and a high isolation, which can impact the quality of voice transmissions made or received using a Bluetooth device and/or improve the quality of a Wi-Fi Internet connection. For example, the antenna switch module 40*c* can improve connection strength and/or access range of the wireless device 30 to a wireless access point for a given amount of power consumption.

The FM/Mobile TV module 48 can be included in the wireless device 30, and can be used to receive and/or transmit radio or television signals, such as FM signals and/or VHF signals. The FM/Mobile TV module 48 can communicate with the fourth and fifth antennas 14*d*, 14*e* using the fourth and fifth antenna switch modules 40*d*, 40*e*, respectively. In certain embodiments described herein, the antenna switch modules 40*d*, 40*e* can have a relatively small area, thereby improving the form factor of a mobile device having mobile TV or FM radio capabilities. Additionally, the antenna switch modules 40*d*, 40*e* can also have a low insertion loss and high isolation, which can lead to improved streaming of multimedia content for a given amount of power consumption.

Although antenna switch modules have been illustrated and described above in the context of two examples of wireless devices, the antenna switch modules described herein can be used in other wireless devices and electronics.

One issue that arises with antenna switch modules is that a typical antenna switch module has multiple ports that can be coupled to the antenna. The ports can comprise ports for different frequencies, for example, ports for GSM 850/900 bands and ports for GSM 1800/1900 as well as others. To isolate the ports that are not being used, an active switch device such as a transistor is typically used. Active switch devices do, however, have a resistive or dissipative loss that degrades the overall efficiency. This is particularly problematic with bands such as the GSM 850/900 band since the maximum output power at the antenna is high when compared to other bands such as EDGE GSM 1800/1900 or WCDMA.

For example, in a typical GSM front end module, the antenna switch contributes to a significant amount of dissipative loss. Losses of 0.5 dB to 1.0 dB can occur in state of the art RF switches used in typical antenna switch modules. Each port will have at least one of these switches and removing at least one of these switches can result in higher efficiency. For example, removing a single one of these switches may even achieve an improvement in efficiency by as much as 5 to 10 percent which, in the non-limiting implementation of a mobile phone or smart phone, can significantly lengthen talk times.

To address this issue, the embodiments disclosed herein contemplate replacing at least one active switch on a first port with a resonance impedance circuit that provides resonance impedance when a different port is being used. The resonance impedance circuit is preferably selected so as to resonate at the frequency of operation of a second port so as to isolate the first port during operation of second port. The use of the resonance impedance circuit provides for sufficient isolation while eliminating an active component switch, such as a transistor, that would otherwise consume limited electrical power.

Figure 3A:
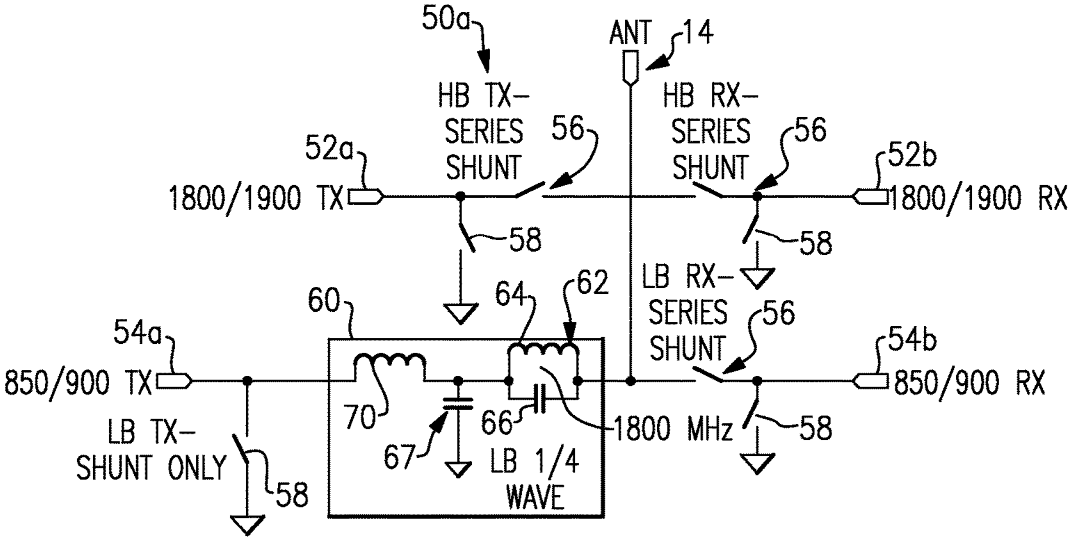
FIGS. 3A and 3B are simplified circuit diagrams of a first and second embodiment of an antenna switch module or a component thereof that is adapted to switch between a first and a second transmission scheme with reduced power consumption.

FIG. 3A is a first exemplary implementation of an antenna switch component 50*a* that is a part of the antenna switch module 12 of FIG. 1. In this implementation, the antenna switch component 50*a* includes a high band transmit port 52*a* and a high band receive port 52*b* as well as a low band transmit port 54*a* and a low band receive port 54*b*. In one implementation, the high band transmit and receive ports 52*a*, 52*b* are configured to transmit and receive signals via the antenna 14 in the approximately 1800 and 1900 MHz frequency bands in a well-known manner. In one implementation, the low band transmit port 54*a* and the low band receive port 54*b* are configured to transmit and receive signals via the antenna 14 in the approximately 850 and 900 MHz bands in a well-known manner.

As shown, the high band transmit and receive ports 52*a*, 52*b* and the low band receive port 54*b* each have a series switch 56 and a shunt switch 58 which can, in some implementations, comprise a field effect transistor circuit. The series switches 56 selectively couple the ports 52*a*, 52*b* and 54*b* to the antenna 14 via a low impedance path when the switches are closed and isolate the ports 52*a*, 52*b* and 54*b* via a high impedance path when open. The shunt switches 58 provide a low impedance path to ground when closed and a high impedance path to ground when open on each of the ports 52*a*, 52*b* and 54*b*.

In operation, when a particular port 52*a*, 52*b*, 54*b* is activated, it is connected to the antenna 14 by closing the appropriate series switch 56 on the port. The series switch 56 on each of the other ports is then opened to isolate the antenna 14 from the non-activated ports. Further, the shunt switch 58 of the activated port is opened so that the antenna signal is provided directly to the port and the shunt switches 58 of the non-activated ports are closed so as to connect the non-activated ports to ground to provide a path to ground.

As shown in FIG. 3A, however, the low band transmit port 54*a* does not have a series switch 56. As shown, the series switch 56 on the low band transmit port 54*a* is replaced with a resonance impedance circuit 60 which, in this implementation, comprises a ¼ wave impedance transformer.

More specifically, the resonance impedance circuit 60 includes an LC circuit 62 that is comprised of an inductor 64 in parallel with a capacitor 66 that has a first end connected in series to the antenna 14. The second end of the LC circuit 62 is connected in series to a matching inductor 70 which is then connected in series to the port 54*a*. The second end of the LC circuit 62 is also connected to a capacitor 67 that is then connected to ground. The port 54*a* is also connected to the ground via a shunt switch 58 that operates in the same manner as the shunt switches 58 described above.

In this implementation, when the low band transmit port 54*a* is selected to transmit, the series switches 56 on the ports 52*a*, 52*b* and 54*b* are opened to isolate these ports from the antenna 14 and the shunt switches 58 are closed to provide further isolation. In this circumstance, the LC circuit 62 functions as part of a low pass filter of the signal that is being transmitted by the low band transmit port 54*a*.

Conversely, when the high band transmit port 52*a* is selected to transmit, the series switch 56 on the port 52*a* is closed, the shunt switch 58 on the port 52*a* is opened and the series switches 56 on the ports 52*b* and 54*b* are opened with the shunt switches 58 on the ports 52*b* and 54*b* being closed. In this way, the high band transmit port 52*a* is connected to the antenna 14 and the ports 52*b* and 54*b* are isolated from the antenna 14 by the switches 56 and 58. Preferably, the LC circuit 62 is selected to resonate at the frequency of the high band transmit port 52*a*. In one non-limiting implementation, the LC circuit 62 is adapted to resonate at the approximate 1800 and 1900 MHz bands.

When this occurs, the LC circuit 62 appears as a high impedance to the signal that is being transmitted by the high band transmit port 52*a* providing additional isolation to the transmit port 52*a*. By using a resonance impedance circuit for isolation, the dissipative loss of an active device, such as a transistor, on the low band transmit port 54*a* can be reduced or avoided thereby preserving power. The LC circuit 62 functions in the same way as a high impedance resonator when the high band receive port 52*b* is activated again providing isolation to the port 52*b*.

When the low band receive port 54*b* is activated, the shunt switch 58 grounds the transmit port 54*a* and the inductor 70 is preferably matched to the impedance of the low band receive port 54*b* to maintain good return loss and the inductor 70 functions as an effective shunt inductor that shunts to ground via the closed shunt switch 58 on the port 54*a* to resonate out the shunt capacitor 67 and present a high impedance to port 54*b* in the 850/900 Rx mode. Thus, in all configurations of the circuit 50*a*, isolation can be provided to the selected ports and one of the active elements on the low band transmit port 54*a* can be replaced by a series of elements that have lowered dissipative loss thereby improving device performance.

Figure 3B:
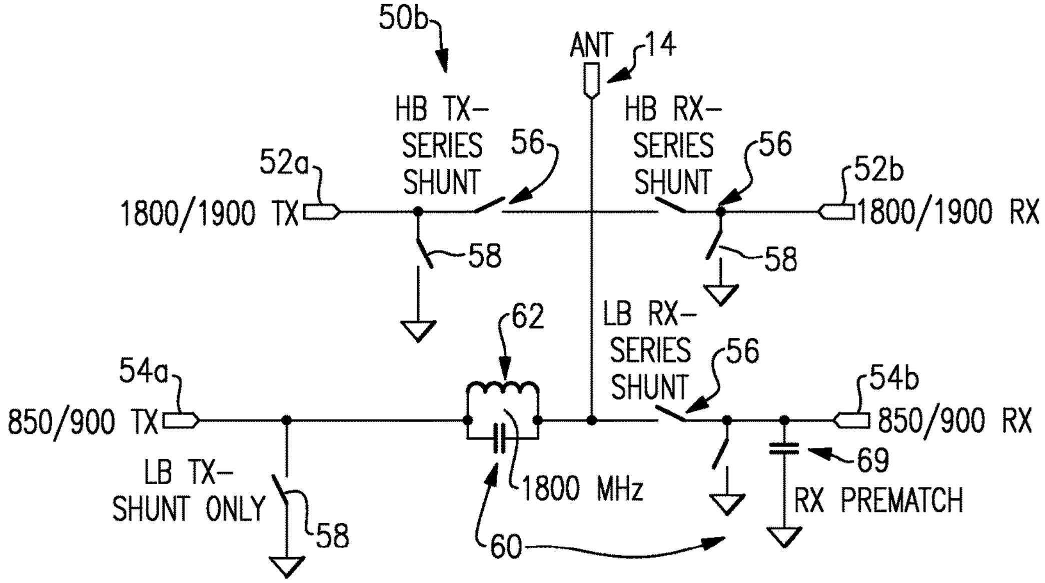

FIG. 3B illustrates another example of a circuit 50*b* that uses a resonance circuit 60 to provide isolation of the low band transmit port 54*b* with an LC circuit component 62. The circuit 50*b* functions in substantially the same way as the circuit 50*a*. The primary difference between the two circuits is that, instead of a quarter wave transformer presenting a high impedance to port 54*b* in the 850/900 Rx mode in the circuit 50*a* of FIG. 3B, a pre-matched capacitor 69 is used. In this way, when the low band receive circuit 54*b* is activated, the inductive load seen on the low band transmit path can be resonated out via the pre-matched capacitor 69. Using either circuit 50*a* or 50*b*, isolation can be provided to each of the ports 52*a*, 52*b*, 54*a*, 54*b* either using the series and shunt switches 56, 58 or by using the resonance impedance circuit 60 which reduces the power consumption.

Figure 4:
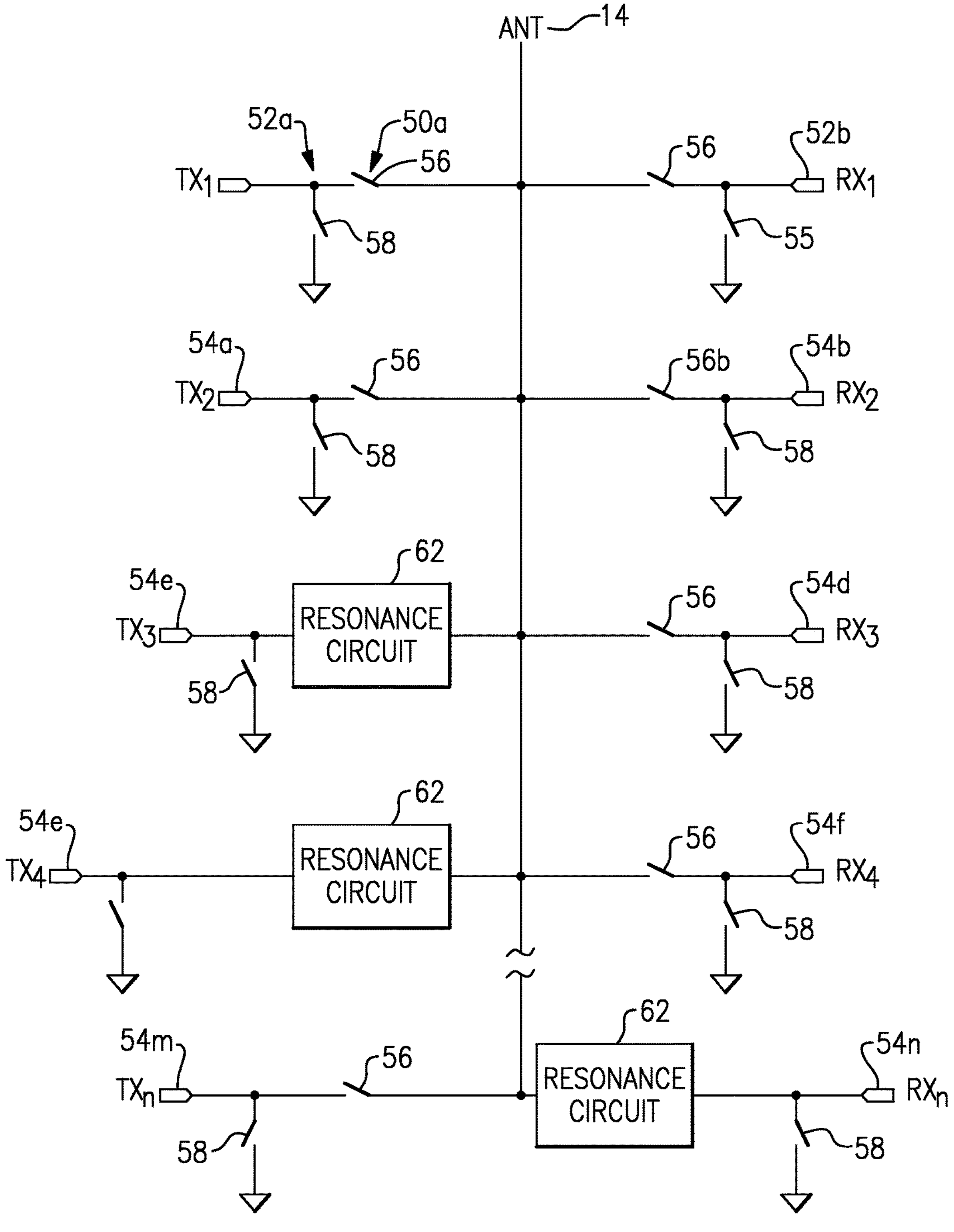
FIG. 4 is a simplified circuit diagram of a switch module or component thereof that is adapted to reduce power consumption by utilizing resonance circuits as opposed to switches on a plurality of different receive or transmit channels.

FIG. 4 is a circuit diagram of a multi-port circuit 50 that can transmit and receive signals on a plurality of different frequencies. In some instances, the ports 52*a*, 52*b*, 54*a*, 54*b* are isolated by series switches 56 and shunt switches 58 that operate in the same manner as described above. However, some of the transmit and receive ports 54*c*, 54*e* and 54*n* have either transmit ports or receive ports that are isolated by resonance circuits 62 that are similar to the resonance circuits described above.

In particular, the resonance circuits 62 are selected so that particular frequencies that are being transmitted or received by different ports are isolated not by series switches 56 but by resonance circuits such as the LC circuits described above that are tuned to resonate at frequencies other than the frequency of the port having the resonance circuit 62. In this way, the resonance circuit 62 provides isolation for that particular port.

In contrast to the resonance circuits 62 described above in conjunction with FIGS. 3A and 3B, in some implementations, the resonance circuits 62 are designed to provide isolation to the receive port, e.g., the receive port 54*n*. Depending upon the circuit configuration, there may be some advantage in replacing a series switch 56 on a receive port for a particular frequency.

Figure 5:
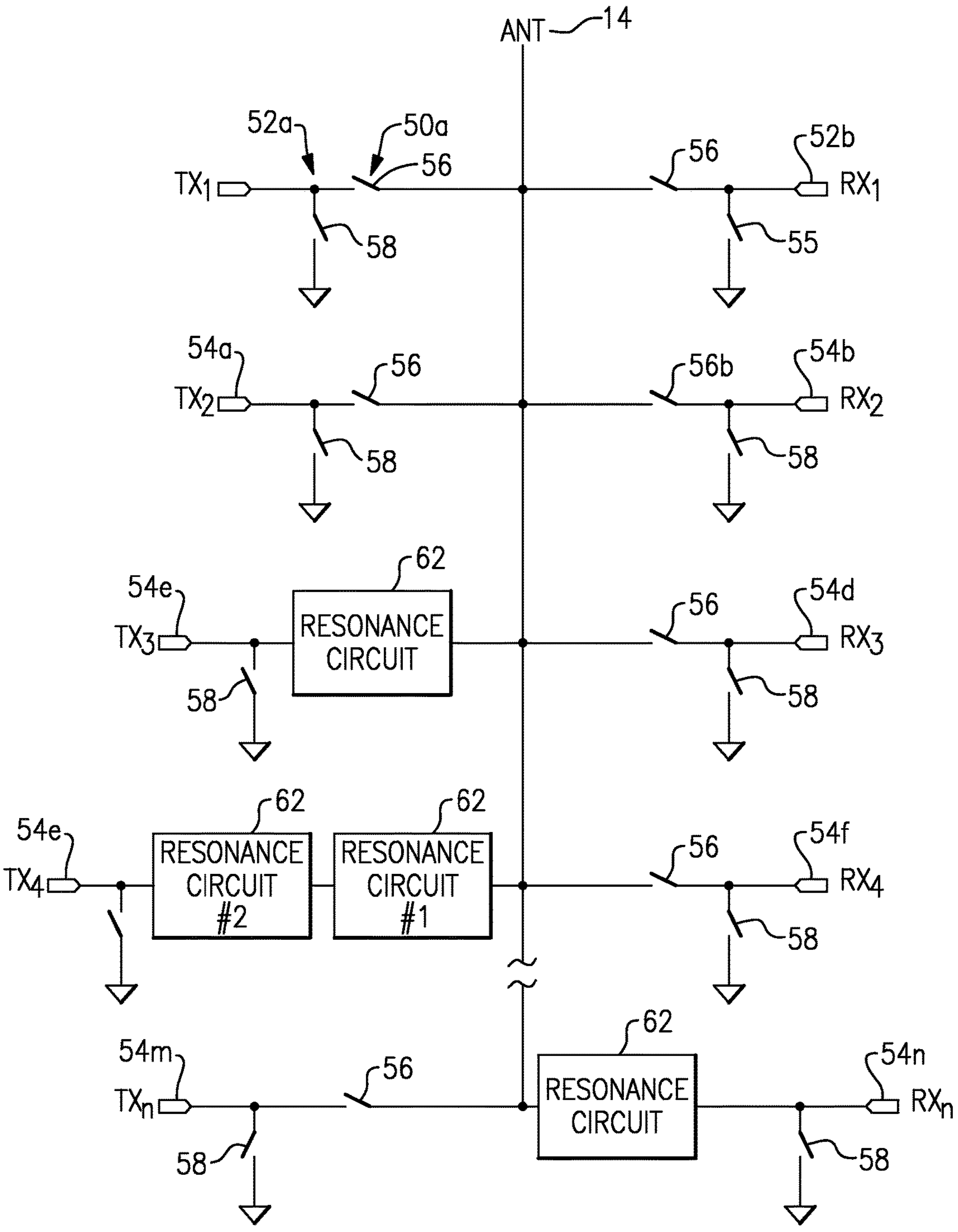
FIG. 5 is another simplified circuit diagram of a switch module or component thereof that is adapted to reduce power consumption by utilizing resonance circuits as opposed to switches on a plurality if different receive or transmit channels

Similarly, as shown in FIG. 5, some ports such as port 54*e* may have multiple resonance circuits 62 that are designed to resonate at multiple different frequencies so that isolation is provided at multiple different frequencies through the resonance circuit as opposed to through a series switch 56. The resonance circuits 62 are selected to resonate at frequencies of operation of a plurality of the other ports. Multiple resonance circuits 62 may be used on either transmit or receive ports. Generally, in implementations like this, the frequencies that the resonance circuits 62 would be resonating at on a single port would have to be widely separated frequencies as there may otherwise be loading issues.

As shown in FIGS. 4 and 5, the possibility of using resonance circuits to provide isolation can extend to different ports and different configurations based upon the implementation.

Applications

Some of the embodiments described above have provided examples in connection with mobile phones. However, the principles and advantages of the embodiments can be used for any other systems or apparatus that have needs for antenna switch modules.

Such antenna switch modules can be implemented in various electronic devices. Examples of the electronic devices can include, but are not limited to, consumer electronic products, parts of the consumer electronic products, electronic test equipment, etc. Examples of the electronic devices can also include, but are not limited to, memory chips, memory modules, circuits of optical networks or other communication networks, and disk driver circuits. The consumer electronic products can include, but are not limited to, a mobile phone, a telephone, a television, a computer monitor, a computer, a hand-held computer, a personal digital assistant (PDA), a microwave, a refrigerator, an automobile, a stereo system, a cassette recorder or player, a DVD player, a CD player, a VCR, an MP3 player, a radio, a camcorder, a camera, a digital camera, a portable memory chip, a washer, a dryer, a washer/dryer, a copier, a facsimile machine, a scanner, a multi-functional peripheral device, a wrist watch, a clock, etc. Further, the electronic devices can include unfinished products.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "can," "could," "might," "can," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

While certain embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. An antenna switch module that interconnects a transceiver and an antenna, the module comprising:
- a first transmit port and a first receive port that operate at a first frequency range;
- a second transmit port and a second receive port that operate at a second frequency range;
- a plurality of switches that selectively connect the first transmit port, the first receive port, and one of the second transmit port or the second receive port to a common antenna for the first and second transmit and receive ports; and
- a resonance impedance circuit that connects at least one of the second transmit port or the second receive port to the antenna, the resonance impedance circuit having components selected to provide a high impedance path when signals are being transmitted at the first frequency range, the resonance impedance circuit including a ¼ wave impedance transformer including a parallel LC circuit component in series with an inductor, the resonance impedance circuit connecting the second transmit port to the antenna and one of the plurality of switches connecting the second receive port to the antenna.

2. The module of claim 1 wherein each of the ports are further connected to ground through a controllable shunt switching device such that when a port is not selected to receive or transmit, the port is configured to be connected to ground to provide isolation for another of the ports that is selected to transmit or receive.

3. The module of claim 1 wherein the first frequency range includes a lower frequency range than the second frequency range.

4. The module of claim 3 wherein the first frequency range includes frequencies in the range of the 1800/1900 MHz band and the second frequency range includes frequencies in the range of the 850/900 MHz band.

5. An antenna switch module that interconnects a transceiver and an antenna, the module comprising:
- a first transmit port and a first receive port that operate at a first frequency range;
- a second transmit port and a second receive port that operate at a second frequency range;
- a plurality of switches that selectively connect the first transmit port, the first receive port, and the second receive port to an antenna; and
- a resonance impedance circuit having components selected to provide a high impedance path when signals are being transmitted at the first frequency range, the resonance impedance circuit connecting the second transmit port to the antenna and one of the plurality of switches connecting the second receive port to the antenna, and the resonance impedance circuit including a parallel LC circuit with a shunt pre-match capacitor, the shunt pre-match capacitor positioned on the second receive port to resonate out an inductive load seen on a path between second transmit port and the antenna when the second receive port is selectively connected to the antenna.

6. The module of claim 5 wherein the first frequency range includes a lower frequency range than the second frequency range.

7. An antenna switch module that interconnects a transceiver and an antenna, the module comprising:

a first transmit port and a first receive port that operate at a first frequency;

a second transmit port and a second receive port that operate at a second frequency;

a plurality of switches that selectively connect the first transmit port, the first receive port, and one of the second transmit port or the second receive port to a common antenna for the first and second transmit and receive ports; and a resonance impedance circuit that connects at least one of the second transmit port or the second receive port to the antenna, the resonance impedance circuit having components selected to provide a high impedance path when signals are being transmitted at the first frequency, the resonance impedance circuit including a ¼ wave impedance transformer including a parallel LC circuit component in series with an inductor, a third transmit port and a third receive port that operate on a third frequency, either the third transmit port or third receive port having a first resonance circuit that resonates at the first frequency so as to isolate the third transmit port or third receive port at that frequency.

8. The module of claim 7 further comprising a second resonance impedance circuit on the third transmit port or third receive port that resonates at the second frequency so as to isolate the third transmit port or third receive port at that frequency.

9. An antenna switch module for switching signals between at least one antenna and a transceiver, the module comprising:

a first transmit port and a first receive port that operate at a first frequency range and are positioned between the antenna and the transceiver;

a second transmit port and a second receive port that operate at a second frequency range and are positioned between the antenna and the transceiver;

a plurality of controllable switching devices respectively positioned in series between the antenna and the first transmit, first receive, and second receive ports so that the first transmit, first receive, and second receive ports are selectively connectable to or isolatable from the antenna; and a resonance circuit connected in series between the second transmit port and the antenna and selected to resonate at the first frequency range to create an impedance sufficient to isolate the second transmit port from the antenna when the antenna is receiving or transmitting signals at the first frequency range, the second transmit port being continuously connected to the antenna by the resonance circuit, wherein the resonance circuit includes a parallel LC circuit with a shunt pre-match capacitor, the shunt pre-match capacitor positioned on the second receive port to resonate out an inductive load seen on a path between the second transmit port and the antenna when the second receive port is selectively connected to the antenna.

10. The module of claim 9 wherein each of the ports are further connected to ground through a controllable shunt switching device such that when a port is not selected to receive or transmit, the port is configured to be connected to ground to provide isolation for another of the ports that is selected to transmit or receive.

11. The module of claim 9 wherein the first frequency range includes a lower frequency range than the second frequency range.

12. The module of claim 11 wherein the first frequency range includes frequencies in the range of the 1800/1900 MHz band and the second frequency range includes frequencies in the range of the 850/900 MHz band.

13. A wireless device comprising:

at least one antenna;

a transceiver; and an antenna switch module including a first transmit port and a first receive port that operate at a first frequency range and are positioned between the antenna and the transceiver, the module further including a second transmit port and a second receive port that operate at a second frequency range and are positioned between the antenna and the transceiver, the module further including a plurality of controllable switching devices respectively positioned in series between the antenna and the first transmit, first receive, and second receive ports so that the first transmit, first receive and second receive ports are selectively connectable to or isolatable from the antenna, and the module further including a resonance circuit that is connected in series between the second transmit port and the antenna and is selected to resonate at the first frequency range to create an impedance sufficient to isolate the second transmit port from the antenna when the antenna is operating at the first frequency range, the second transmit port being continuously connected to the antenna by the resonance circuit; and a third transmit port and a third receive port that operate on a third frequency range, either the third transmit port or third receive port having a first resonance circuit that resonates at the first frequency range so as to isolate the third transmit port or third receive port at that frequency range.

14. The device of claim 13 wherein each of the ports are further connected to ground through a controllable shunt switching device such that when a port is not selected to receive or transmit, the port is configured to be connected to ground to provide isolation for another of the ports that is selected to transmit or receive.

15. The device of claim 13 wherein the first frequency range includes a lower frequency range than the second frequency range.

16. The device of claim 15 wherein the first frequency range includes frequencies in the range of the 1800/1900 MHz band and the second frequency range includes frequencies in the range of the 850/900 MHz band.

17. The device of claim 13 wherein the wireless device provides cellular telephony communications.

18. The device of claim 13 further comprising a second resonance circuit on the third transmit port or third receive port that resonates at the second frequency range so as to isolate the third transmit port or third receive port at that frequency range.

19. The device of claim 13 wherein the resonance circuit includes a parallel LC circuit with a shunt pre-match capacitor, the shunt pre-match capacitor positioned on the second receive port to resonate out an inductive load seen on a path between the second transmit port and the antenna when the second receive port is selectively connected to the antenna.

20. A wireless device comprising:

at least one antenna;

a transceiver; and an antenna switch module including a first transmit port and a first receive port that operate at a first frequency range and are positioned between the antenna and the transceiver, the module further including a second transmit port and a second receive port that operate at a second frequency range and are positioned between the antenna and the transceiver, the module further including a plurality of controllable switching devices respectively positioned in series between the antenna and the first transmit, first receive, and second receive ports so that the first transmit, first receive and second receive ports are selectively connectable to or isolatable from the antenna, and the module further including a resonance circuit that is connected in series between the second transmit port and the antenna and is selected to resonate at the first frequency range to create an impedance sufficient to isolate the second transmit port from the antenna when the antenna is operating at the first frequency range, the second transmit port being continuously connected to the antenna by the resonance circuit, the resonance circuit including a ¼ wave impedance transformer including a parallel LC circuit component in series with an inductor.

21. The device of claim 20 further comprising a third transmit port and a third receive port that operates on a third frequency range.

22. The device of claim 20 wherein the resonance circuit includes a ¼ wave impedance transformer.

23. The device of claim 20 wherein the wireless device provides cellular telephony communications.

24. A wireless device comprising:

at least one antenna;

a transceiver; and an antenna switch module including a first transmit port and a first receive port that operate at a first frequency range and are positioned between the antenna and the transceiver, the module further including a second transmit port and a second receive port that operate at a second frequency range and are positioned between the antenna and the transceiver, the module further including a plurality of controllable switching devices respectively positioned in series between the antenna and the first transmit, first receive, and second receive ports so that the first transmit, first receive and second receive ports are selectively connectable to or isolatable from the antenna, and the module further including a resonance circuit that is connected in series between the second transmit port and the antenna and is selected to resonate at the first frequency range to create an impedance sufficient to isolate the second transmit port from the antenna when the antenna is operating at the first frequency range, the second transmit port being continuously connected to the antenna by the resonance circuit, the resonance circuit including a parallel LC circuit with a shunt pre-match capacitor, the shunt pre-match capacitor positioned on the second receive port to resonate out an inductive load seen on a path between the second transmit port and the antenna when the second receive port is selectively connected to the antenna.

25. The device of claim 24 wherein the wireless device provides cellular telephony communications.

* * * * *